United States Patent Office 2,763,680
Patented Sept. 18, 1956

2,763,680

IMINO-DICARBOXYLIC ACIDS AND FUNCTIONAL DERIVATIVES THEREOF AND PROCESS OF MAKING SAME

Richard Sallmann, Basel, Switzerland, assignor to Ciba Limited, Basel, Switzerland, a Swiss firm No Drawing. Continuation of abandoned application Serial No. 231,060, June 11, 1951. This application December 15, 1953, Serial No. 398,438

Claims priority, application Switzerland June 16, 1950

7 Claims. (Cl. 260—507)

This application is a continutaion of application Serial No. 231,060, filed June 11, 1951, now abandoned and relates to new imino-dicarboxylic acids of the general

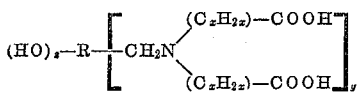

wherein R represents a radical of the benzene series, the hydroxyl group or groups are of phenolic character and at least one radical

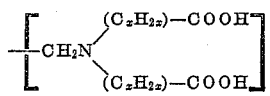

is connected in ortho position to a hydroxyl group, and wherein each of the symbols $x$, $y$ and $z$ is a whole number smaller than three, and functional derivatives of such acids.

The acids of the general formula given in the first paragraph, their salts and derivatives may also be designated as compounds of the general formula

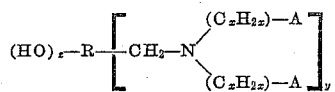

wherein R, $x$, $y$ and $z$ have the meanings given in the first paragraph above, and A represents a member selected from the group consisting of —COOH, —COO-alkali, —CN and —COO-alkyl. In this definition, alkali has the meaning of sodium or potassium cation, and alkyl has the meaning of a lower alkyl radical, e. g. methyl, ethyl, etc.

The acids of the formula first mentioned above and their derivatives may be made by reacting a compound of the benzene series which corresponds to the general formula $$R-(OH)_z$$

in which $z$ has the meaning given above and in which the hydroxyl group or groups are of phenolic character and a hydrogen atom is present in ortho-position with respect to at least one hydroxyl group, in either order of succession with formaldehyde or with a compound yielding formaldehyde, and with an imino-dicarboxylic acid of the general formula

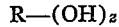

in which $x$ has the meaning given above, or with a salt or derivative of such imino-dicarboxylic acid.

Acids of the above general formula

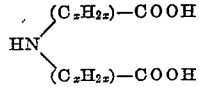

or functional derivatives thereof, can also be made by reacting an aromatic compound of the general formula

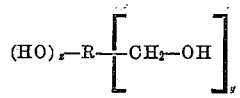

in which R represents the radical of a compound of the benzene series in which the hydroxyl group or groups are of phenolic character and at least one methylol group is in ortho-position with respect to at least one hydroxyl group, and in which $y$ and $z$ have the meanings given above, with an imino-dicarboxylic acid of the above general formula

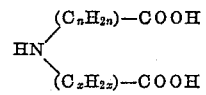

or with a salt or derivative of such acid.

They may also be made by reacting a halogen methyl derivative of the general formula $$(HO)_z-R-(CH_2-Hal)_y$$

wherein R, $y$ and $z$ have the meanings given above and at least one group —(CH₂ Hal) is in ortho-position to at least one —OH group, with an imino dicarboxylic acid of the general formula given above.

The aromatic compounds of the general formula $$R-(OH)_z$$

used as starting materials are phenols or phenol-like compounds. They may contain one or more phenolic hydroxyl groups and may be free from or contain further substituents, but they must contain in at least an ortho-position with respect to at least one phenolic hydroxyl group a hydrogen atom. Among compounds suitable for use in the present invention there may be mentioned phenol, ortho-meta- or para-cresol, higher alkylated phenols such as 4-butyl-phenol, 4-dodecyl-phenol, 4-octadecyl-phenol, chlorophenols such as ortho- or para-chlorophenol, 2:4-dichlorophenol, para nitrophenol, para-acetylaminophenol, salicylic acid, para-hydroxybenzoic acid, phenol sulfonic acids such as para-phenol sulfonic acid, and furthermore polynuclear hydroxy-compounds such as 4-hydroxydiphenyl, 4-hydroxydiphenyl ether, 2-cyclo-hexylphenol, 2-phenyl-phenol and 4-benzyl-phenol.

Among the aromatic compounds which contain more than one phenolic hydroxyl group there may be mentioned pyrocatechol, resorcinol and hydroquinone.

The above mentioned phenol-like compounds may also be used as starting materials for preparing the corresponding halogen methyl- or methylol-compounds of the general formula

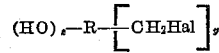

and

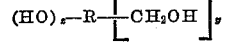

which may be prepared by methods in themselves known. Among the methylol-compounds suitable for the present invention there may be mentioned, among others, mono-, di- or tri-methylol-phenol, 4-dodecyl-2-methylol-phenol or 2:6-dimethylol-4-methyl-phenol.

Among the halogen-methyl compounds of phenols to be used in the present invention there may be mentioned 2:6-dichloromethyl-4-methyl-phenol and 2-chloromethyl-4-nitrophenol.

The formaldehyde is advantageously used in aqueous solution or in the form of para-formaldehyde.

As imino dicarboxylic acids of the general formula

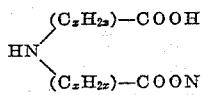

there come into consideration imino-dipropionic acids of the formulae

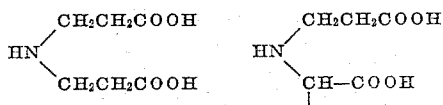

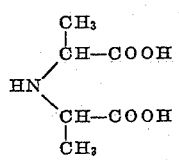

and above all imino-diacetic acid of the formula

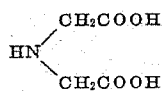

Instead of the free acids there may be used derivatives thereof such as their nitriles or esters, for example, methyl or ethyl esters, or water-soluble salts thereof such as alkali metal or alkaline earth metal salts. When derivatives of the imino-dicarboxylic acids such as the esters or nitriles are used as starting materials, the free acids may be obtained after the condensation by hydrolysis which may be carried out by known methods with alkalis or acids.

The reaction of the halogen methyl compounds of the general formula

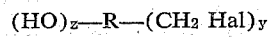

with the imino-dicarboxylic acids or salts or derivatives thereof is advantageously carried out by heating the components, preferably with the addition of an organic solvent such as benzene, toluene, xylene, low boiling benzine, ethyl acetate, alcohol, butanol and the like. Preferably two molecular proportions of the imino-dicarboxylic acid are used for each molecular proportion of the halogen-methyl-compound, one molecular proportion of the imino-dicarboxylic acid serving to bind the hydrohalic acid formed.

If instead of the free imino-dicarboxylic acid a derivative thereof is used for the condensation, the product of the condensation may be subsequently hydrolyzed to produce the free acid.

The reaction of the phenol-like compounds of the general formula

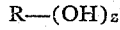

with formaldehyde and with the imino-dicarboxylic acid is advantageously carried out in the presence of an aqueous solution of an alkali hydroxide, to which may, if desired, be added a water-soluble organic solvent such as methyl alcohol, ethyl alcohol, acetone or dioxane. The reaction is carried out at room temperature or at a raised temperature for example, 50–70° C. When a phenol-like methylol-compound is used as starting material it may be condensed with an imino-dicarboxylic acid in an aqueous alkaline solution, or the methylol compound may be reacted with a derivative for example, an ester of the imino-dicarboxylic acid, in the presence of an acid, for example, acetic acid, and the resulting ester may, if desired, be subsequently hydrolyzed.

When compounds of the general formula first mentioned above are made in the manner described above from a phenol-like compound, formaldehyde and an imino-dicarboxylic acid as defined above, different products can be obtained depending on the relative proportions of the components used and on the degree of substitution of the phenol-like compound. Thus, when one mol of a phenol, one mol of formaldehyde and one mol of imino-dicarboxylic acid are used there are obtained compounds of the general formula

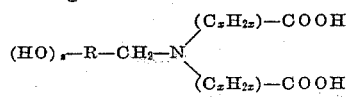

in which R, $x$ and $z$ have the meanings given above. On the other hand, when one mol of a phenol which contains hydrogen atoms in two ortho-positions, or in one ortho- and the para-position with respect to a phenolic hydroxyl group is condensed with two mols of formaldehyde and 2 mols of the imino-dicarboxylic acid there are obtained compounds of the general formula

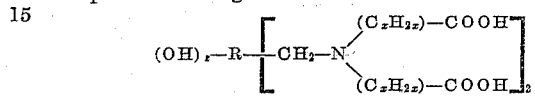

in which R, $x$ and $z$ have the meanings given above. In carrying out the condensation the individual components may be mixed together in any order of succession. If the phenol-like compound and formaldehyde are first added together there is obtained as an intermediate product the corresponding methylol-compound which then reacts with the imino-dicarboxylic acid. If on the other hand the imino-dicarboxylic acid is first mixed with formaldehyde there is produced as an intermediate product probably an imino-methylol-compound or a di-imino-methylene compound, which cannot be isolated, and which then reacts with the phenol-like compound.

The new acids of the general formula first mentioned above and obtainable by the process of the invention are distinguished by their property of forming complex metal compounds with various metal ions. Acids which are obtained from phenol or from phenols containing as substituents lower alkyl radicals or halogen atoms, form water-soluble complex compounds with calcium ions. Consequently, they can be used as agents for the dissolution of lime soaps and as agents for inhibiting the formation of lime soaps. Compounds containing higher alkyl radicals such as butyl or amyl radicals are suitable as mercerizing agents, compounds which are obtained by starting, for example, from dodecyl-phenol or octadecyl-phenol, can be used as soaps and softening agents resistant to weak acids such as acetic acid.

For the above mentioned uses the free carboxylic acids or their alkali salts are employed. The other derivatives, such as nitriles and esters, are used as intermediate products, especially for the preparation of the free acids or their salts.

Suitably substituted compounds, especially those containing halogen atoms or nitro groups, can be used for making preparations which are suitable for combating moulds and bacteria, by using the corresponding complex copper, zinc or mercury salts.

From compounds of the general formula first mentioned above, which possess the character of dyestuffs, complex metal compounds can also be obtained, and especially advantageous are the copper and chromium complex compounds.

The following examples illustrate the invention, the parts being by weight unless otherwise stated and the relationship of parts by weight to parts by volume being the same as that of the kilogram to the liter:

*Example 1*

A solution of 8.0 parts of imino-diacetic acid in 10 parts of water and 7.0 parts by volume of a caustic soda solution of 30 per cent strength are introduced while stirring into a solution of 3.2 parts of para-cresol in 5 parts of water and 3 parts by volume of a caustic soda solution of 30 per cent strength at room temperature, and then 5.4 parts of a formaldehyde solution of 37 per cent. strength are added. An oil separates which redissolves after a short time. The reaction is completed by heating the mixture for one hour at 60–70° C. Since the reaction product cannot be separated either from a neutral or an acid solution, the solution is evaporated to dryness in vacuo. 14.5 parts of a yellowish pulverulent product are obtained, which is very easily soluble in water. The product corresponds to the formula

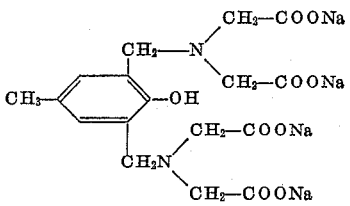

In order to dissolve, at 70° C., 500 cc. of a dispersion of lime soap, which has been prepared by mixing 5 cc. of a solution containing 111 grams of calcium chloride per 5 liters of water, with 5 cc. of a solution containing 282 grams of oleic acid and 56 grams of potassium hydroxide per 2.5 liters of water, and making the resulting dispersion up to 500 cc., 18 cc. of a solution containing 2 grams of the reaction product per 100 cc. of water are required for complete clarification.

*Example 2*

To a solution of 2.9 parts of phenol in 5 parts of water and 3 parts by volume of a caustic soda solution of 30 per cent. strength are added while stirring, first, a solution of 8.0 parts of imino-diacetic acid in 10 parts of water and 8 parts by volume of a caustic soda solution of 30 per cent. strength and then 5.4 parts of a formaldehyde solution of 37 per cent. strength. After stirring the solution for one hour at a bath temperature of 60–70° C., it is evaporated to dryness in vacuo. 15 parts of a slightly yellowish solid product are obtained, which is very easily soluble in water. 19 cc. of a 2 per cent. solution of the resulting product is required to dissolve the lime soap dispersion described in Example 1.

*Example 3*

To a solution of 4.9 parts of 2:4-dichloro-phenol in 5 parts of water and 3 parts by volume of caustic soda solution of 30 per cent. strength are added while stirring, first, a solution of 4.0 parts of imino-diacetic acid in 5 parts of water and 4 parts by volume of a caustic soda solution of 30 per cent. strength, and then 2.7 parts of a formaldehyde solution of 37 per cent. strength, whereby the oil which separates initially slowly redissolves. After heating the mixture for one hour at 60–70° C., the reaction is complete. The slightly turbid solution, after dilution with water, is mixed with carbon prepared from blood, filtered and evaporated in vacuo. 10.5 parts of a white solid product, which is easily soluble in water is obtained. While the aqueous solution remains clear after the addition of acetic acid, the acid which is sparingly soluble in water is precipitated in a resinous form by means of hydrochloric acid and redissolves in an excess of hydrochloric acid. The product corresponds to the formula

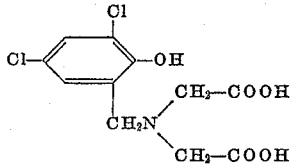

25 cc. of a solution containg 2 grams of the above product per 100 cc. are required to dissolve the lime soap dispersion described in Example 1. With a solution of copper acetate the product forms a yellowish green complex copper salt which is soluble in water. The copper cannot be precipitated from an aqueous solution of the complex salt by means of sodium carbonate.

*Example 4*

7 parts of 4-octadecyl-phenol are dissolved in 30 parts by volume of alcohol and 2 parts by volume of a caustic soda solution of 30 per cent. strength and then there are added while stirring, first, a solution of 3.0 parts of imino-diacetic acid in 6 parts of water and 3.2 parts by volume of a caustic soda solution of 30 per cent. strength, and then 1.8 parts of a formaldehyde solution of 37 per cent. strength. After stirring the whole for 6 hours at 70° C., a test portion dissolves in water to give a clear solution. The solution foams strongly and remains clear after the addition of acetic acid. After evaporation in vacuo the product is triturated with ether in order to extract small quantities of a water-insoluble body.

*Example 5*

To a solution of 3.3 parts of pyrocatechol in 10 parts of water there are added, while stirring, first, 8.1 parts of imino-diacetic acid dissolved in 10 parts of water and 8.5 parts by volume of a caustic soda solution of 30 per cent. strength, and then 4.9 parts of formaldehyde solution of 37 per cent. strength. After the addition of 6 parts by volume of a caustic soda solution of 30 per cent. strength, the whole is heated for one hour at 60–70° C. By neutralization and evaporation in vacuo, a product is obtained of which the value for its property of dissolving lime soap is the same as that of the product of Example 1.

*Example 6*

26.6 parts of imino-diacetic acid are dissolved in 20 parts of water and 38 parts by volume of a caustic soda solution of 30 per cent. strength. There are added to the solution a solution of 30 parts of para-acetylamino-phenol in 20 parts of water and 20 parts by volume of a caustic soda solution of 30 per cent. strength, and then, while stirring, 18 parts of a formaldehyde solution of 37 per cent. strength. After stirring the reaction mixture for 5 hours at 60–70° C., it is acidified with hydrochloric acid and evaporated to dryness in vacuo. The residue is stirred at a raised temperature with 100 parts of hydrochloric acid of 20 per cent. strength, whereby the product is dissolved but the greater part of the sodium chloride remains undissolved. After filtration and washing the residue with hydrochloric acid the filtrate is boiled for one hour under reflux, and then evaporated to dryness in vacuo. The residue obtained in the form of a pale yellow solid product is the dihydrochloride of the condensation product.

*Example 7*

33 parts of ortho-acetylamino-para-cresol are dissolved in 50 parts of water and 20 parts by volume of a caustic soda solution of 30 per cent. strength. There are then added while stirring, first, a solution of 29.4 parts of imino-diacetic acid in 25 parts of water and 41 parts by volume of a caustic soda solution of 30 per cent. strength, and then 18 parts of a formaldehyde solution of 37 per cent. strength. By the addition of 45 parts by volume of alcohol, a precipitate which is initially formed is brought into solution. The whole is then heated, while stirring, for 1½ hours at 60–70° C. At the end of this period the reaction is complete. The solution is evaporated in vacuo almost to dryness, the residue is diluted with water to 200 parts by volume and rendered weakly acid with concentrated hydrochloric acid. The condensation product slowly crystallizes out. Crystallization is completed by cooling and the product is then isolated by filtration. The still moist press cake, which is soluble in alkalis and also in dilute acids, is boiled with 150 parts of hydrochloric acid of 20 per cent. strength for one hour under reflux. By evaporation in vacuo the hydrochloride of 2-hydroxy-3-amino-5-methyl-benzylamino-diacetic acid is obtained in the form of a pale yellow powder.

Example 8

A solution of 33 parts of imino-diacetic acid dimethyl ester (boiling at 115° C. under 13 mm. pressure) in 50 parts by volume of benzene is slowly added dropwise, while stirring, to a solution of 10.2 parts of 2:6-dichloromethyl-para-cresol in 50 parts by volume of benzene. When the addition is complete, the mixture is heated for 2 hours in a water bath having a temperature of 50–60° C. After a short time the hydrochloride of imino-diacetic acid dimethyl ester begins to separate in a crystalline form. When the reaction is complete, the precipitated salt is separated by filtering with suction, and the filter residue is washed with benzene. The filtrate is freed from benzene in vacuo, whereby 18.0 parts of a colorless viscous oil are obtained. This oil is dissolved in alcohol and the solution is mixed while hot with an aqueous solution of barium hydroxide until the alkaline reaction persists. After heating for one hour at 70–80° C., the whole is mixed with a quantity of sulfuric acid such that neither barium ions nor sulfuric acid ions can be detected in a filter test portion. The whole is then filtered to remove barium sulfate, and the filtrate is evaporated to dryness in vacuo. 16 parts of a solid white product are obtained which is very easily soluble in water and can be crystallized from alcohol. The product corresponds to the formula

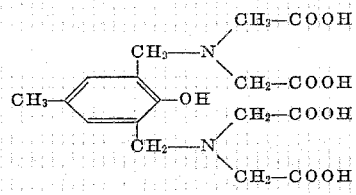

14.7 cc. of a solution of 2 per cent. strength of the above product are required to clarify completely the lime soap dispersion described in Example 1.

Example 9

A solution of 107 parts of imino-diacetic acid-dimethyl ester in ethyl acetate are added dropwise, while stirring, and cooling with ice, to a solution of 62 parts of 4-nitro-2-chloromethyl-phenol in 300 parts by volume of ethyl acetate. After a short time, the hydrochloride of imino-diacetic acid dimethyl ester begins to separate in crystalline form. After heating the reaction mixture for two hours at 40–50° C. the precipitated salt is separated by filtration, washed with ethyl acetate, and the filtrate is evaporated to dryness. 3-nitro-6-hydroxy-benzylamino-diacetic acid dimethyl ester is obtained in theoretical yield in the form of yellow crystals. After recrystallization from alcohol the product melts at 96.5–97.5° C.

A solution of the above product in absolute alcohol is reduced in a shaking autoclave at 90–100° C. and 30–50 atmospheres gauge pressure of hydrogen using nickel as catalyst. After two hours the necessary quantity of hydrogen is taken up and the pressure remains constant.

Since the reduced compound is easily oxidizable, the alcoholic solution after being filtered is acidified with hydrochloric acid and evaporated to dryness. An aqueous solution of 35 parts of the hydrochloride so obtained in the form of a green powder is neutralized with sodium carbonate, whereby the base is precipitated in the form of a yellow-green resinous precipitate. The mother liquor is poured off and the residue is covered with a hot solution of 35 parts of barium hydroxide in 200 parts of water. The whole dissolves except for very small quantities of a resin. The solution is heated for 10 minutes on the steam bath under nitrogen, and then filtered. The filtrate is then mixed with sulfuric acid until a filter test portion is not rendered turbid either with sulfuric acid or with barium chloride. By filtration and evaporation in vacuo, 3-amino-6-hydroxybenzylamino-diacetic acid is obtained in the form of a pale brownish solid product which is very easily soluble in water.

Example 10

A solution of 5.1 parts of 2:6-dimethylol-4-methyl-phenol and 9.6 parts of imino-diacetic acid dimethyl ester in 20 parts by volume of glacial acetic acid is heated at 60–70° C., while stirring.

While the components of this solution do not possess the property of dissolving lime soaps, this property increases as the reaction time increases, as will be seen from the table given below.

Every hour 1 cc. of the solution is withdrawn, dissolved in a small quantity of water, rendered alkaline with caustic soda solution, and saponified on the steam bath for 5 minutes. The whole is then diluted with water to 50 cc., and 100 cc. of the lime soap dispersion described in Example 1 are titrated with the solution at 70° C. to produce a clear solution. The quantities used for clarification are as follows:

|  | cc. |
|---|---|
| After 1 hour | 30 |
| After 2 hours | 22.5 |
| After 3 hours | 18.4 |
| After 4 hours | 14.6 |
| After 5 hours | 12.4 |
| After 14 hours | 9.8 |

Accordingly, the effectiveness of the resulting product as an agent for dissolving lime soap is of the same order as those of the products of Examples 1 and 8.

Example 11

To a solution of 5.0 parts of di-hydroxymethyl-para-cresol in 20 parts of water and 3.0 parts by volume of caustic potash solution of 40 per cent strength is added a solution of 8.0 parts of imino-diacetic acid in 10 parts of water and 10.0 parts by volume of caustic potash solution of 40 per cent strength. The whole is heated to 80–90° C. while stirring, whereby the effectiveness of the reaction mixture as an agent for dissolving lime soap soon appears, as can be shown titrimetrically. After 12 hours a test for complete clarification of 100 cc. of the lime soap dispersion described in Example 1 shows that 6.4 cc. of a solution containing 1 cc. of the reaction mixture per 50 cc. of water were required.

Example 12

20 parts of the compound of the formula

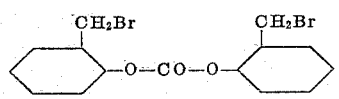

are dissolved in 50 parts by volume of dry benzene. A solution of 32.2 parts of imino-diacetic acid dimethyl ester in 50 parts by volume of benzene are slowly added while stirring, the reaction setting in with slight heating and accompanied by the precipitation of the hydrobromide of imino-diacetic acid dimethyl ester. After heating for 5 hours at 70–80° C., the reaction is complete. The solution is filtered to remove the hydrobromide of imino-diacetic acid dimethyl ester obtained as a by-product, and the residue is washed with benzene. The benzene solution is then evaporated.

40 parts of the residual thick oil are dissolved in 80 parts by volume of ethyl alcohol and 20 parts of water. 75 parts by volume of a sodium hydroxide solution of 30 per cent strength are added gradually and the temperature is maintained at 50–60° C. by slight cooling. Finally the whole is heated to the boil for a short time, whereby the hydrolysis is completed and a test portion is soluble in water to give a clear solution. After cooling to room temperature the whole is mixed with 53 parts by volume of hydrochloric acid of 37 per cent strength so that the solution has a pH value of 1.5. After evaporation at 60–70° C. in vacuo, the residue is dissolved in boiling water, and after cooling (2'-hydroxybenzyl)-di-(carboxymethyl)-amine of the formula

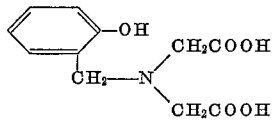

crystallizes out in colorless needles. One mol of the compound requires one mol of caustic soda solution for neutralization when phenolphthalein is used as an indicator.

*Example 13*

64 parts of the sodium salt of phenol-para-sulfonic acid are dissolved in 100 parts of water and 30 parts by volume of a caustic soda solution of 30 per cent strength. There are then added, first, a solution of 80 parts of iminodiacetic acid in 100 parts of water and 100 parts by volume of a caustic soda solution of 30 per cent strength, and then 54 parts of a formaldehyde solution of 37 per cent strength are added while stirring. The solution is heated for 4 hours while stirring at 60–70° C., neutralized with hydrochloric acid and evaporated to dryness in vacuo. The product may be purified by recrystallization from dilute alcohol. There is obtained a white powder which is easily soluble in water and has a very good capacity for dissolving lime soap.

*Example 14*

32 parts of para-cresol are dissolved in 100 parts of water and 30 parts by volume of 30% caustic soda solution.

To the solution there is added a solution of 96 parts of iminodipropionic acid (melting point 150–151° C.) in 100 parts of water and 80 parts by volume of 30% caustic soda solution. There are then slowly added while stirring at 20–30° C., 54 parts of a 37% formaldehyde solution.

After this the reaction mixture, which is of alkaline reaction, is heated to 60–70° C. for 2 hours. The clear solution is rendered neutral with acetic acid and then evaporated to dryness under reduced pressure. There are obtained 180 parts of a white powder which is very easily soluble in water. On addition of mineral acid, the solution remains clear. The condensation product obtained corresponds to the formula

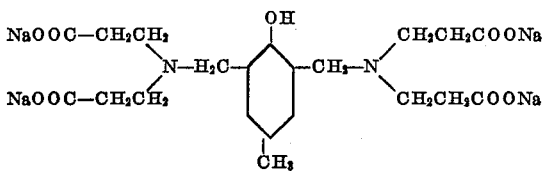

What is claimed is:

1. A compound of the general formula

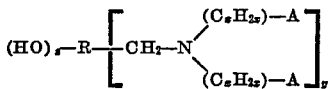

wherein R represents a radical of the benzene series, the hydroxyl group has phenolic character and at least one radical

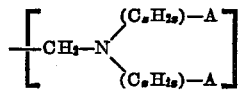

is being connected in ortho position to a hydroxyl group, and wherein each of the symbols $x$, $y$ and $z$ is a whole number smaller than three, and A represents a member selected from the group consisting of —COOH, —COO - alkali - metal, —CN and —COO - lower alkyl.

2. A compound of the general formula

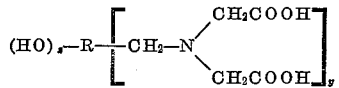

wherein R is a radical of the benzene series, the hydroxyl group is of phenolic character and at least one group

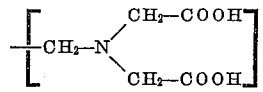

is connected in ortho-position to a hydroxyl group, and wherein $y$ and $z$ are whole numbers smaller than three.

3. The compound of the formula

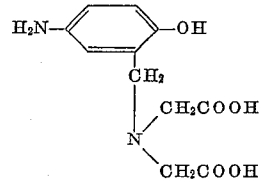

4. The compound of the formula

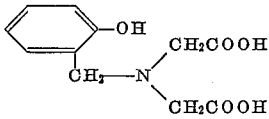

5. The compound of the formula

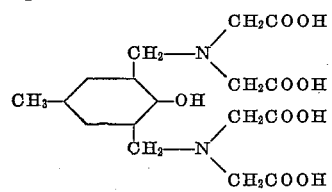

6. The compound of the formula

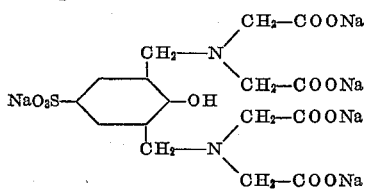

7. The compound of the formula

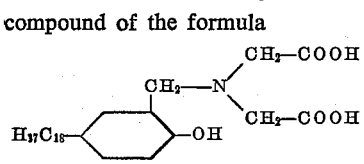

References Cited in the file of this patent

UNITED STATES PATENTS

| | | |
|---|---|---|
| 2,122,409 | Clarke et al. | July 5, 1938 |
| 2,562,198 | McKinney et al. | July 31, 1951 |

FOREIGN PATENTS

| | | |
|---|---|---|
| 642,244 | Germany | Mar. 6, 1937 |
| 48,570 | France | Apr. 5, 1938 |
| | (3rd. add'n. to 742,358) | |

OTHER REFERENCES

Litzinger et al.: J. Am. Chem. Soc., vol. 56, 124–6 (1934.)

Decennial Index to Chem. Abs., vols. 21–30, A–D, pg. 3155 (1927–1936.)

Bruson et al.: J. Am. Chem. Soc., vol. 63, pgs. 270–2 (1941.)